United States Patent
Balasubramaniyan et al.

(10) Patent No.: US 7,209,720 B2
(45) Date of Patent: Apr. 24, 2007

(54) MULTIBAND AND MULTIMODE TRANSMITTER AND METHOD

(75) Inventors: Arul Balasubramaniyan, Round Lake, IL (US); David Peckham, Barrington Hills, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 435 days.

(21) Appl. No.: 10/648,468

(22) Filed: Aug. 26, 2003

(65) Prior Publication Data

US 2005/0048932 A1   Mar. 3, 2005

(51) Int. Cl.
H04B 1/02 (2006.01)
(52) U.S. Cl. ............................. 455/127.5; 455/552.1; 455/93; 375/307
(58) Field of Classification Search ............. 455/127.1, 455/127.5, 127.4, 552.1, 574, 572, 93, 553.1; 375/307
See application file for complete search history.

(56) References Cited

U.S. PATENT DOCUMENTS 5,794,159 A * 8/1998 Portin ..................... 455/553.1
6,269,253 B1 * 7/2001 Maegawa et al. ........ 455/552.1
6,466,803 B1 * 10/2002 Gardner ................... 455/553.1
6,643,522 B1 * 11/2003 Young ...................... 455/552.1
2003/0060176 A1 * 3/2003 Heinonen et al. ........... 455/255

* cited by examiner

Primary Examiner—Edward F. Urban
Assistant Examiner—Adeel Haroon
(74) Attorney, Agent, or Firm—Vedder, Price, Kaufman & Kammholz, P.C.

(57) ABSTRACT

A multiband and multimode transmitter circuit (200) includes two separate oscillators, such as at least a first oscillator circuit (60), a second oscillator circuit (62), a corresponding first signal processing circuit (64), and second signal processing circuit (66) to produce a first output frequency signal (78) defined within the first or second band of frequencies in response to a transmitter input signal (46). Each oscillator and corresponding signal processing circuit (64, 66) may be optimized for the lowest power consumption while meeting the noise performance criteria in each of the multiple frequency bands. The multiband and multimode transmitter circuit (200) may produce the transmitter output signal (36) with either linear modulation or nonlinear modulation and at a first band or second band frequencies.

21 Claims, 7 Drawing Sheets

MULTIBAND AND MULTIMODE TRANSMITTER AND METHOD

FIELD OF THE INVENTION

The invention relates generally to transmitters and, more particularly, to multiband transmitters.

BACKGROUND OF THE INVENTION

With the emergence of multiple radio frequency bands and multiple modulation modes available for wireless communications, there is a need for transmitting radio frequency (RF) communication signals within multiple frequency bands and multiple modulation modes. For example, the emergence of various communications standards has driven the need for wireless communication devices, such as wireless telephones, wireless personal data assistants (PDAs), pagers, two-way radios, and other types of wireless devices, to be compatible with multiple standards employing multiple modulation modes and multiple radio frequency bands. Having multimode and multiband capability allows a wireless device to operate with more than one system or standard, and, depending on the system available, the user can potentially use the device on more than one wireless communication system.

A multimode communication device is designed to transmit and receive RF communication signals of different modulation schemes depending on the communication systems' modulation schemes in operation in the user's geographical location. For example, modulation schemes for digital RF signals may include time division multiple access (TDMA) schemes, code division multiple access (CDMA) schemes, global system for mobile communications (GSM) based schemes, second generation wireless data technology schemes (2G, including intermediate standards such as 2.5G), third generation (3G) wireless data technology schemes, multiple access schemes such as Enhanced Data Rates for Global Systems for Mobile Communications Evolution (EDGE), or other suitable technology schemes.

A multiband and multimode wireless device incorporates electronics necessary to operate within a plurality of systems using multiple frequency bands and multiple modulation nodes. For example, the transmitter stage of a multiband and multimode wireless device can be similar to the transmitter stage of a single band wireless device designed to transmit within one frequency band, but is adapted to transmit at multiple frequency bands. Accordingly, a dual band and dual mode wireless device has the capability to operate in two different modes at two different frequency bands, such as one band for GSM, and one band for EDGE. This allows a user to move from one system to another, as long as the multiband and multimode wireless device supports the standard for the system in operation.

Figure 1:
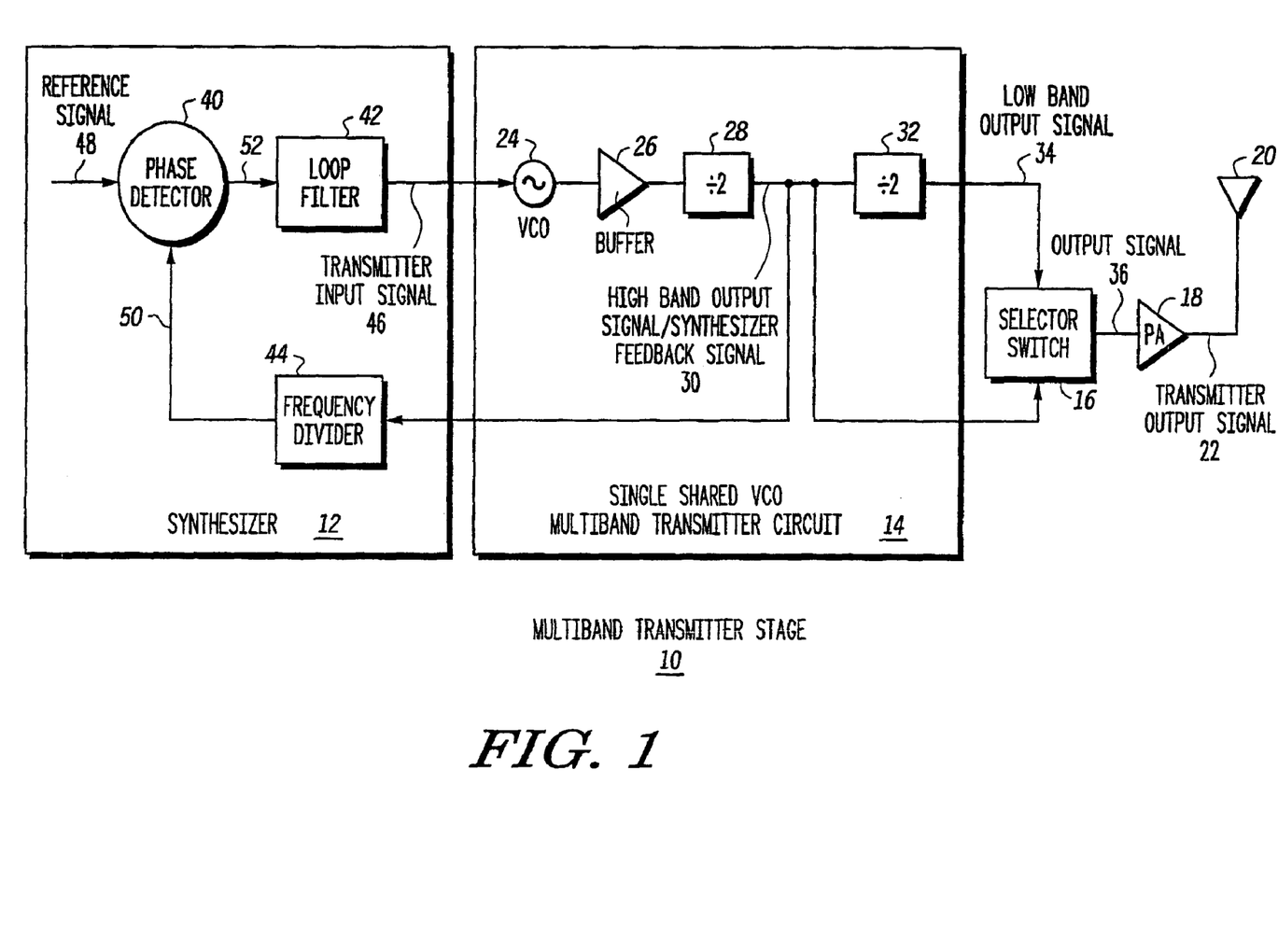
FIG. 1 is a block diagram of a prior art single shared VCO multiband RF transmitter stage.

As shown in FIG. 1, a typical multiband transmitter stage 10 may include a synthesizer 12, a single shared voltage controlled oscillator (VCO) 24, a multiband transmitter circuit 14, a selector switch 16, a power amplifier (PA) 18, and a dual band antenna 20 to transmit a transmitter output signal 22, that, at different times, is at different frequencies in different bands. Single shared VCO multiband transmitter circuit 14 includes a single shared VCO 24, a VCO buffer 26, a first divide-by-two circuit 28, and a second divide-by-two circuit 32. The single shared VCO 24 produces a VCO output frequency signal 25. VCO buffer amplifier 26 buffers the VCO output frequency signal 25. First divide-by-two circuit 28 produces a high band output signal/synthesizer feedback signal 30 and the second divide-by-two circuit 32 produces a low band output signal 34. Selector switch 16 switches between the low band output signal 34 and the high band output signal/synthesizer feedback signal 30 to produce an output signal 36 for amplification by the power amplifier (PA) 18 and subsequent transmission by the dual band antenna 20.

Alternatively, the low band output signal 34 and the high band output signal/synthesizer feedback signal 30 may be coupled to separate PAs for amplification and then combined for transmission over dual band antenna 20 or over separate high and low band antennas. The single shared VCO multiband transmitter circuit 14 employs the single shared VCO 24 and therefore employs a single "transmitter path" because the output of the single shared VCO 24 covers transmission in the multiple frequency bands.

Synthesizer 12 includes a phase detector 40, a loop filter 42 and a frequency divider 44. Synthesizer 12 produces a transmitter input signal 46 as a tuning voltage to the single shared VCO 24 of multiband transmitter circuit 14. Phase detector 40 receives reference signal 48 and a divided synthesizer feedback signal 50 for producing a phase detector output signal 52. Loop filter 42 receives the phase detector output signal 52 to produce the transmitter input signal 46 to provide the tuning voltage to single shared VCO 24, as previously stated. The single shared VCO multiband transmitter circuit 14 provides the high band output signal/synthesizer feedback signal 30 to synthesizer 12 as a feedback signal to form a phase locked loop. Although multiband transmitter circuit 14 is described herein as including the single shared VCO 24, the VCO buffer 26, the first divide-by-two circuit 28, and the second divide-by-two circuit 32, the single shared VCO multiband transmitter circuit 14 may be considered part of synthesizer 12 to form the phase locked loop circuit, as known in the art. Synthesizer 12 may be used to apply GMSK (Gaussian Mean Shift Keying) modulation as known in the art.

The single shared VCO 24 may, depending on the circuit, reduce the amount of circuitry required when compared to a multi-VCO circuit for a multiband transmitter, resulting in a more compact transmitter within, for example, a wireless communication device. This approach may require minimal design effort, since a single VCO and VCO transmitter path is employed. As a result, the cost and complexity of the multiband transmitter stage 10 may be reduced by using a single shared VCO 24 for the multiband transmitter circuit 14. The single shared VCO 24 for the single shared VCO multiband transmitter circuit 14 is also used because many complementary wireless telecommunications standards in the 800/900 MHz band and in the 1800/1900 MHz band, for example, conveniently allow for the use of a single shared VCO 24 by using the first and second divide-by-two circuits 28, 32 since the 1800/1900 MHz band is a multiple of two for the 800/900 MHz band.

However, using a single shared VCO 24 compromises power consumption, noise performance and other performance criteria for the multiband transmitter circuit 14. Firstly, the single shared VCO multiband transmitter circuit 14 is required to meet the necessary noise criteria when functioning in each of the multiple frequency bands. As a result, the power consumption of the single shared VCO multiband transmitter circuit 14 when operating with the more stringent noise criteria for one band, such as in the 800 MHz or 900 MHz band, can result in unnecessarily high power consumption of the single shared VCO multiband transmitter circuit 14 when operating in a frequency band such as in the 1800 MHz or 1900 MHz band, where the noise criteria may be relatively less stringent. Therefore, either power consumption is increased so that the single shared VCO multiband transmitter circuit 14 meets the required noise criteria for the band with the most stringent noise criteria, or the noise criteria in the band having the more stringent noise criteria is not met if power consumption is lowered to meet the noise criteria of the band having less stringent noise criteria. Consequently, the single shared VCO 24 for the single shared VCO multiband transmitter circuit 14 configuration may not operate at optimal power consumption and noise performance levels.

A second method for achieving multiband transmission capability is to utilize a single shared VCO 24 that is switched via a switching circuit and two band-pass filters operating in different bands between two transmitter paths. Although this approach uses only a single shared VCO 24, adding the switching circuit and band-pass filters can add insertion loss, thus decreasing a level of the transmitter output signal 22 and increasing the generation of transmitter circuit noise. In addition, the cost and complexity of the shared single VCO 24 for the single shared VCO multiband transmitter circuit 14 can be exacerbated when configured with a switching circuit and band-pass filters.

BRIEF DESCRIPTION OF THE DRAWINGS

The present invention is illustrated by way of example and not limitation in the accompanying figures, in which like numerals indicate similar elements, and in which.

DETAILED DESCRIPTION OF THE PREFERRED EMBODIMENT

A multiband and multimode transmitter and method employs two separate oscillators, where one of the oscillators produces a transmitter output signal at one of multiple frequency bands. Each oscillator may be any suitable device that generates a periodic signal, such as an analog or digital signal. For example each oscillator may be a phase locked loop (PLL) circuit, a crystal oscillator circuit, or a voltage controlled oscillator (VCO) circuit. Since each oscillator functions to provide an output signal at a particular band of frequencies, each oscillator and a corresponding signal processing circuit may be optimized for the lowest power consumption while meeting the noise performance criteria in each of the multiple frequency bands.

The multiband and multimode transmitter circuit includes at least a first oscillator circuit and a first signal processing circuit to produce a first output frequency signal in a first band and at least a second oscillator circuit and a second signal processing circuit to produce a second output frequency in a second frequency band. Each band of frequencies defines an operating range of frequencies, such as the first band of frequencies and the second band of frequencies, which may overlap. Alternatively, each band of frequencies may be in completely different bands of frequencies. The multiband transmitter circuit benefits from, among other things, reduced power consumption while complying with the required noise criteria in each of the multiple frequency bands.

Each oscillator is operatively coupled to each corresponding signal processing circuit. Depending on the band of operation, the processing circuits produce a transmitter output signal for the corresponding band of frequencies. According to one embodiment, the multiband transmitter circuit enables the oscillator and corresponding signal processing circuit in order to provide a transmitter output signal at the desired frequency band, and disables or reduces power to the other oscillator and signal processing circuit. For example, a band selection circuit may select the band of operation and may disable the oscillator and corresponding signal processing circuit by providing power control signals to reduce power to the oscillators and signal processing circuits that are not in use in order to reduce power consumption. For example, the band selection circuit selects either or both the band mode and the modulation mode, and stores the band mode and the modulation mode in a storage element such as a group of registers indicating the circuit to disable. A processing circuit, such as a microprocessor, may send control information to a band selection circuit for selectively enabling and disabling each oscillator and corresponding signal processing circuit based on selecting the band mode and the modulation mode. Accordingly, the multiband and multimode transmitter circuit may produce the transmitter output signal with either linear modulation or nonlinear modulation and at a first band or second band frequencies. Accordingly, the multiband transmitter circuit benefits from low power consumption in each band of operation and each mode of operation.

A wireless device includes the multiband transmitter circuit and an antenna to transmit the transmitter output signal. As previously stated, the processing circuit may include control signals to reduce power to the oscillators and each corresponding signal processing circuit in the multiband transmitter circuit.

A method for producing a transmitter output signal in a first or second band of frequencies includes producing a first oscillator output frequency signal defined within the first band of frequencies in response to receiving a transmitter input signal. A signal processing circuit receives the first oscillator output frequency signal to produce a transmitter output signal in the first band of frequencies. Alternatively, in response to receiving a transmitter input signal, a second oscillator output frequency signal is produced in a second frequency band. The transmitter input signal may be a tune voltage for controlling the oscillator so that the transmitter input signal may be provided by a synthesizer circuit. Additionally, the signal processing circuit may receive the transmitter input signal, which could be a baseband in phase and quadrature signal, and the first or second oscillator output frequency signal to produce a transmitter output signal in the first or second band of frequencies.

Figure 2:
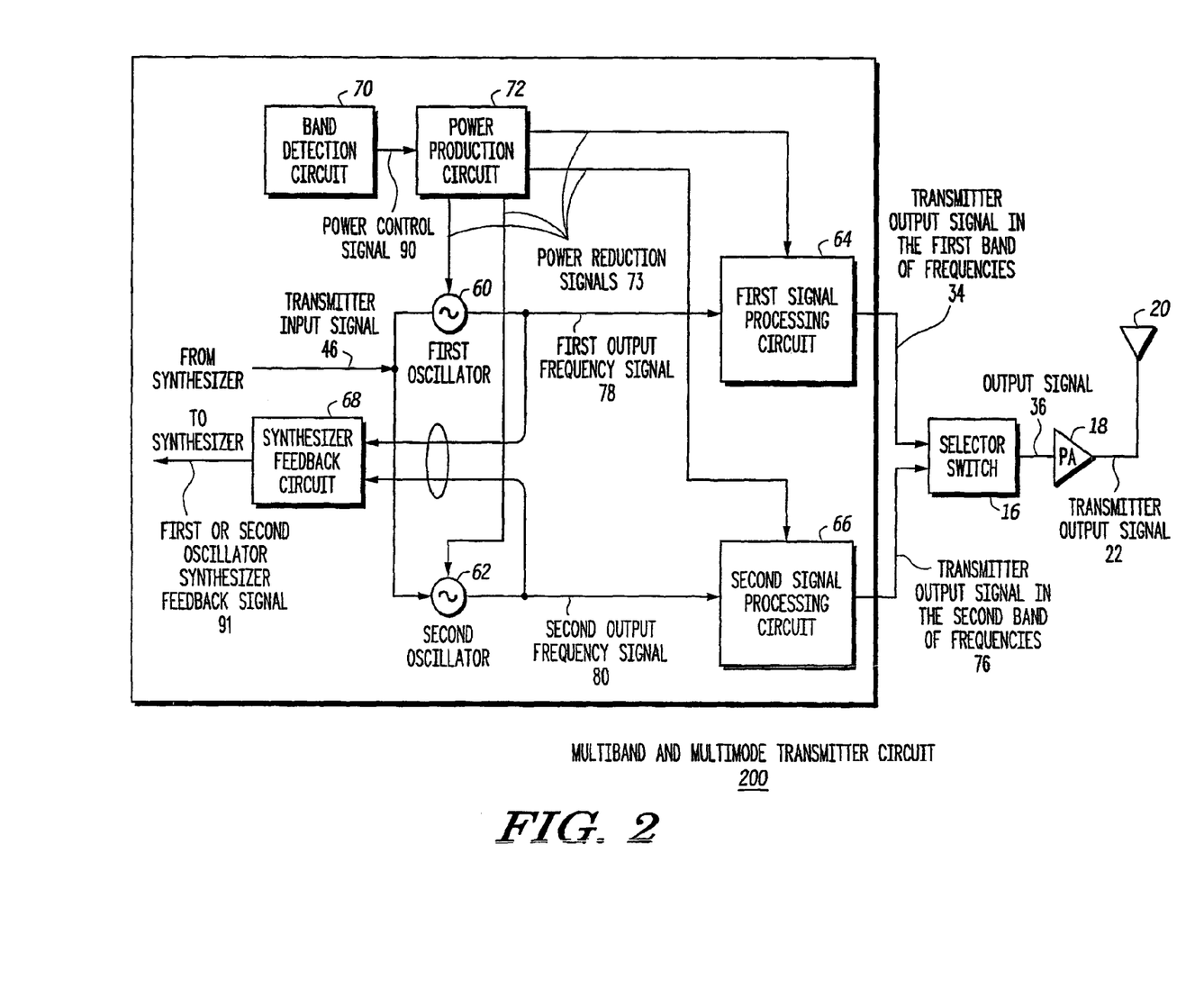
FIG. 2 is a block diagram illustrating one example of a multiband transmitter circuit according to one exemplary embodiment of the invention.

FIG. 2 illustrates one example of a multiband and multimode transmitter circuit 200 that is coupled to a multiband antenna 20 via a band selection switch 16, a power amplifier 18 and other suitable components as mentioned with respect to FIG. 1. The multiband and multimode transmitter circuit 200 receives a transmitter input signal 46 from a synthesizer such as synthesizer 12 as previously described with respect to FIG. 1. However, in contrast to the single shared VCO multiband transmitter circuit 14, the multiband and multimode transmitter circuit 200 includes at least a first oscillator 60, and a second oscillator 62. As a result, transmitter input signal 46 feeds two or more oscillator circuits in multiband transmitter circuit 200, as opposed to the single shared VCO 24 of the single shared VCO multiband transmitter circuit 14 shown in FIG. 1.

The multiband and multimode transmitter circuit 200 also includes a first signal processing circuit 64, a second signal processing circuit 66, a synthesizer feedback circuit 68, an optional band selection circuit 70, and an optional power reduction circuit 72. The multiband transmitter 200 receives the transmitter input signal 46 and produces a transmitter output signal 74 in a first band of frequencies or a transmitter output signal 76 in a second band of frequencies.

The first oscillator 60 produces a first output frequency signal 78 defined within the first band of frequencies in response to the transmitter input signal 46. The first signal processing circuit 64 is coupled to the first oscillator 60 to receive the first output frequency signal 78 defined within the band of frequencies. The first signal processing circuit 64 produces the transmitter output signal 74 in the first band of frequencies in response to the received first output frequency signal 78. The second oscillator 62 produces a second output frequency signal 80 in response to the transmitter input signal 46. The second signal processing circuit 66 is coupled to the second oscillator 62, and produces the transmitter output signal 76 within the second band of frequencies in response to the second output frequency signal 80.

Each oscillator 60, 62 may be any suitable circuit that generates periodic signals, such as an analog or digital signal. For example each oscillator 60, 62 may be a phase locked loop (PLL), a crystal oscillator, a voltage controlled oscillator, or any other suitable periodic signal provider. Since each oscillator 60, 62 functions to provide an output signal at a particular band of frequencies, each oscillator 60, 62 and the corresponding signal processing circuit 64, 66 may be optimized for the lowest power consumption while meeting the noise performance criteria in each of the multiple frequency bands.

The band selection circuit 70 provides a power control signal 90 that represents transmitting in the first band of frequencies or in the second band of frequencies with either linear or nonlinear modulation. For example, band selection circuit 70 may include a register that stores a bit representing transmitting in the desired band of frequencies, such as a first band of frequencies, a second band of frequencies, a third band of frequencies and so on. For example, the register within the band selection circuit 70 may receive an indication of the band or modulation mode of operation from, for example, a user input via a graphical user interface such as a menu on a wireless device, or a control signal from a communication system such as a base station, or from an indication that a user is leaving one system operating in one band of frequencies, and entering another system operating on another band of frequencies, or any other suitable device or method. If the band selection circuit 70 selects transmitting in the first band of frequencies, then the band selection circuit 70 provides the power control signal 90 to the power reduction circuit 72 to selectively and dynamically reduce power, for example, via a voltage divider, transistor, or any other suitable power reduction circuit to the second oscillator 62, and to the second signal processing circuit 66.

It will be recognized that reducing power to the first oscillator 60, the first signal processing unit 64, the second oscillator 62, and the second signal processing circuit 66 includes disabling power to these circuits, by for example, reducing either the voltage or the current or both, to the respective circuits, placing the circuits in a tri-state mode, switching off an input signal, or any other suitable method or mechanism. As a result, power may be completely, or partially provided to the first oscillator 60, the first signal processing circuit 64, the second oscillator 62, and the second signal processing circuit 66. For example, a disabling circuit either in the power reduction circuit 72, in the respective circuit, or in any suitable location may operatively disable a power source, such as a power supply voltage or any suitable power source, to each of the respective circuits for either reducing or completely turning off power to the desired circuits. Power may be reduced to each circuit dynamically because if the band or modulation mode changes, for example, during a wireless communication call, then the power reduction circuit 72 may dynamically and selectively reduce power to any circuit.

The power reduction circuit 72 is operatively coupled to provide power reduction signals 73 to the first oscillator 60, the first signal processing circuit 64, the second oscillator 62, and the second signal processing circuit 66. If the band selection circuit 70 selects transmitting in the second band of frequencies, then the power reduction circuit 72 selectively and dynamically reduces power to the first oscillator 60, and to the first signal processing circuit 64.

The multiband and multimode transmitter circuit 200 may include or may be coupled to a synthesizer, such as synthesizer 12 as previously described with respect to FIG. 1, to provide a first or second oscillator synthesizer feedback signal 91. Since, according to one embodiment, either first oscillator 60 or second oscillator 62 is enabled, the first or second oscillator synthesizer feedback signal 91 is based on either the first output frequency signal 78 or the second output frequency signal 80, depending on the oscillator enabled. The synthesizer 12 provides the transmitter input signal 46 to the first oscillator 60, and to the second oscillator 62. It will be recognized that synthesizer feedback circuit 68 provides the first or second oscillator synthesizer feedback signal 91 to synthesizer 12 in response to receiving the first output frequency signal 78 from first oscillator 60, or second output frequency signal 80 from second oscillator 62, depending on the band of operation, as feedback from first oscillator 60 or second oscillator for circuit 62. The synthesizer feedback circuit 68 may include, for example, a differential amplifier or any other suitable circuit having two inputs, one to receive the first output frequency signal 78, and another input to receive the second output frequency signal 80.

The multiband and multimode transmitter circuit 200 may transmit the transmitter output signal 22 and receive all its communication signals operating over multiple frequency bands and multiple modulation modes. The multiband and multimode transmitter circuit 200 has the capability to operate at least at two different modes and at two different frequency bands. According to this embodiment, the first band of frequencies includes frequencies from 824 MHz to 915 MHz. The second band of frequencies may include frequencies from 1701 MHz to 1910 MHz. However, the multiband and multimode transmitter circuit 200 may operate at any of the following bands of frequencies according to the table below or at any other suitable frequencies and bands within, for example, a wireless device:

| Standard | Receive Frequency Start (MHz) | Receive Frequency End (MHz) | Transmit Frequency Start (MHz) | Transmit Frequency End (MHz) |
|---|---|---|---|---|
| GSM | 869 | 894 | 824 | 849 |
| EGSM | 925 | 960 | 880 | 915 |
| DCS | 1805 | 1880 | 1710 | 1785 |
| PCS | 1930 | 1990 | 1850 | 1910 |
| UMTS | 2110 | 2170 | 1920 | 1980 |

Figure 3:
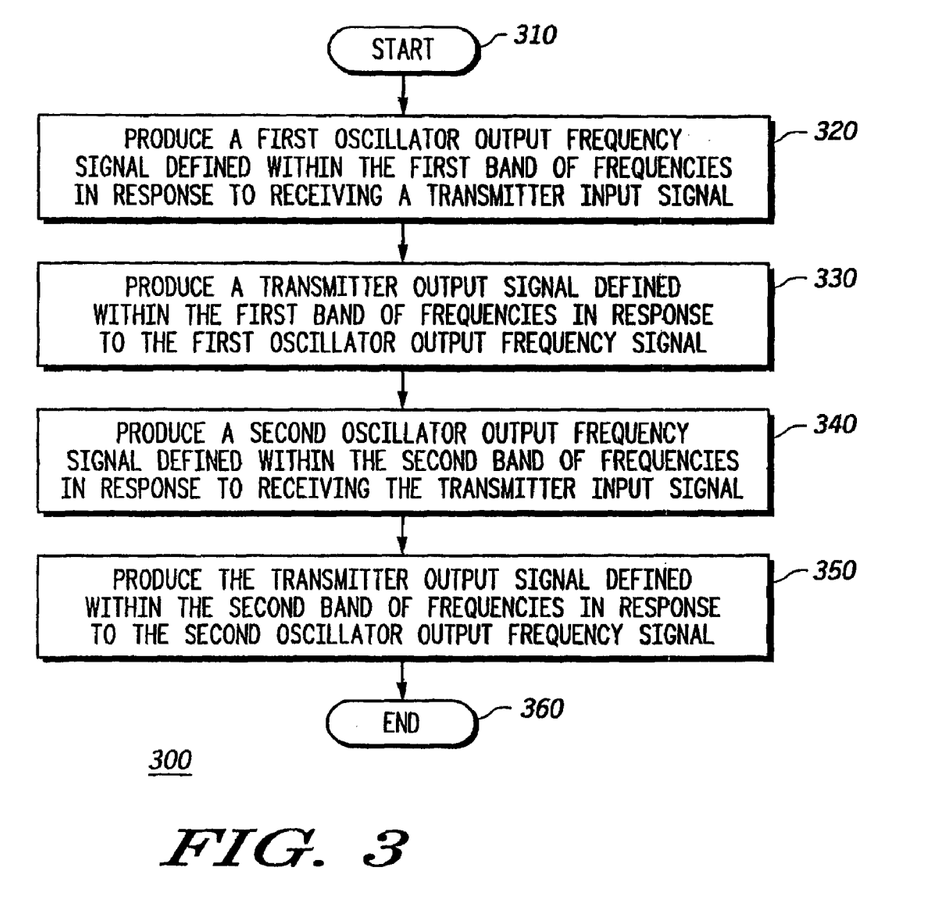
FIG. 3 is a flow chart illustrating one example of a method for generating a transmitter output according to one embodiment of the invention.

FIG. 3 illustrates a method 300 for producing the transmitter output signals 74, 76 at a frequency defined in one of each at least a first band of frequencies and a second band of frequencies in accordance with one embodiment of the invention. The method 300 may be carried out by the multiband transmitter circuit 200. However, any other suitable structure may also be used. It will be recognized that the method 300, beginning with step 310, will be described as a series of operations, but the operations may be performed in any suitable order. As shown in step 320 the first oscillator 60 produces the first output frequency signal 78 defined within the first band of frequencies (including a multiple thereof such as twice or four times the transmitter output signal 74 in the first band of frequencies) in response to receiving a transmitter input signal 46. As previously stated, the first oscillator 60 may be a voltage controlled oscillator coupled to the synthesizer, such as synthesizer 12 as shown in FIG. I. As used herein, the first output frequency signal 78 defined within the first band of frequencies includes frequency multiples of the first band of frequencies as discussed in more detail below. For example, the method, as shown in step 330, produces the transmitter output signal 74 defined within the first band of frequencies in response to the first output frequency signal 78 may be any multiple of the transmitter output signal 74 in the first band of frequencies.

As shown in step 340, the second oscillator 62 produces the second oscillator output frequency signal 80 defined within the second band of frequencies including a multiple thereof in response to receiving the transmitter input signal 46. As used herein, a reference to the second output frequency signal 80 defined with the second band of frequencies includes frequency multiples of the second band of frequencies, as discussed in more detail below. For example, the band selection circuit 70 previously described selects the band and modulation mode to provide power reduction signals 73, for example, to reduce power to the second oscillator 62 in response to the power control signal 90 that represents transmitting in the first band of frequencies. Similarly, the power reduction circuit 72 may reduce power to the first oscillator 60 in response to the power control signal 90 that represents transmitting in the second band of frequencies. As shown in step 350, the method includes producing the transmitter output signal 76 defined within the second band of frequencies in response to the second output frequency signal 80.

Figure 4:
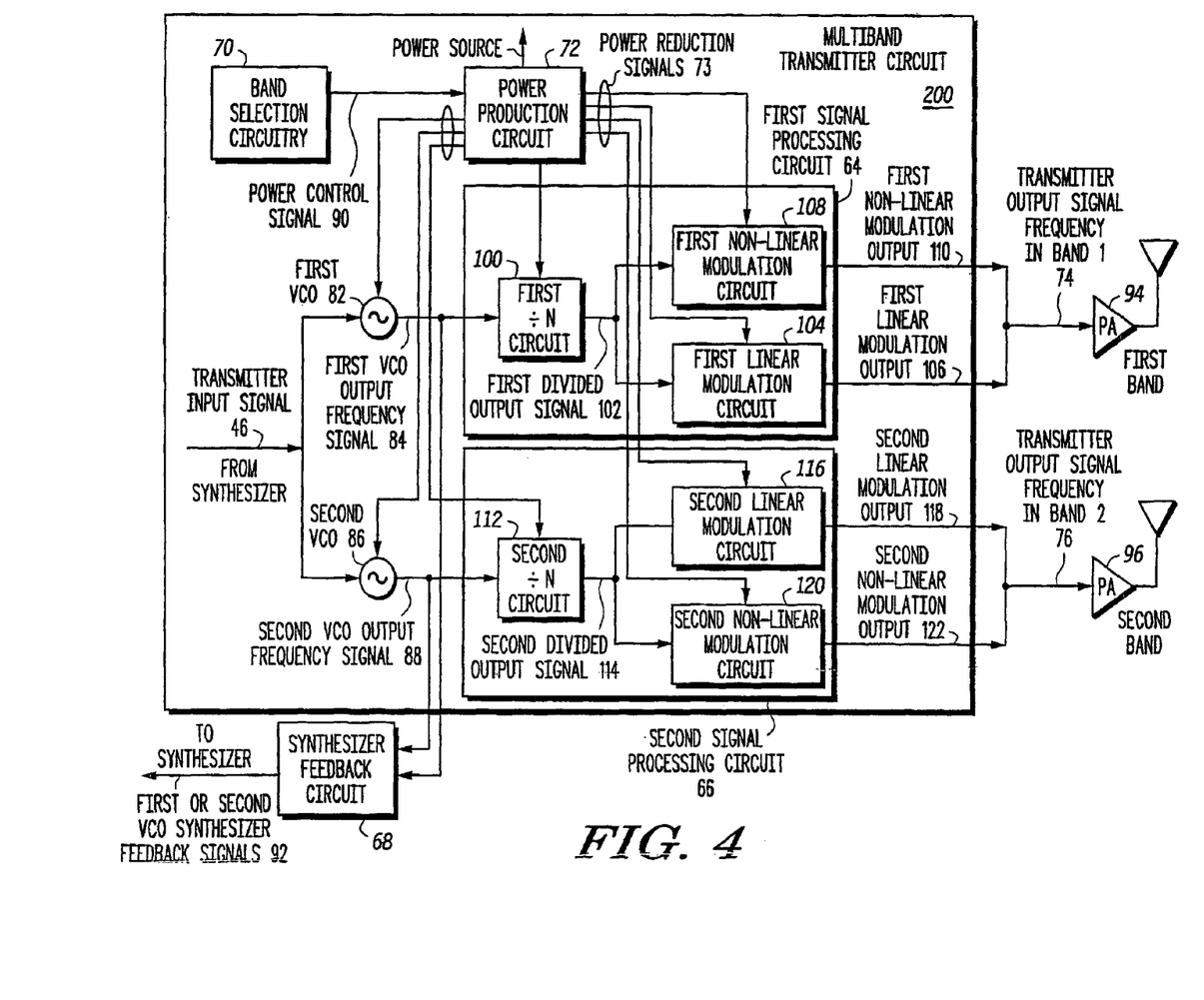
FIG. 4 is a block diagram illustrating an example of a multiband transmitter circuit that employs a dual VCO transmitter circuit according to one exemplary embodiment of the invention.

FIG. 4 illustrates in more detail, one embodiment of the multiband and multimode transmitter circuit 200 of FIG. 2. According to this embodiment, the first oscillator 60 further includes a first voltage controlled oscillator (VCO) 82 that produces a first voltage controlled oscillator (VCO) output frequency signal 84 defined within the first band of frequencies (including a multiple thereof, if desired) in response to the transmitter input signal 46. Additionally, the second oscillator 62 of FIG. 2 further includes a second VCO 86 to produce a second VCO output frequency signal 88 defined in the second band of frequencies including a multiple thereof in response to the transmitter input signal 46. As previously described, the first and second voltage controlled oscillators 82, 86 may be part of a phase locked loop with synthesizer 12.

The first VCO output frequency signal 84, according to one embodiment, is an integral multiple (such as twice or four times) of the transmitter output signal 74 at a frequency defined in the first band of frequencies. Similarly, the second VCO output frequency signal 88, according to this embodiment, is an integral multiple of the transmitter output signal 76 at a frequency defined in the second band of frequencies. According to this embodiment, both the first VCO 82 and the synthesizer 12 operates at N (where N is an integral multiple) times the transmitter output signal 74 in the first band of frequencies so that interference between the transmitter output signal 74 in the first band of frequencies and between the first VCO 82 and the synthesizer 12 is reduced or minimized. Similarly, the second VCO 86 and the synthesizer 12 operates at N times the transmitter output signal 76 in the second band of frequencies so that the transmitter output signal 76 in the second band of frequencies avoids interfering with second VCO 86 and the synthesizer 12. For example, since the transmitter output signal 74 in the first band of frequencies and the transmitter output signal 76 in the second band of frequencies is amplified at a high power level by power amplifiers 94, and 96, circuits such as first VCO 82, first signal processing circuit 64, second VCO 86, and second signal processing circuit 66 may experience interference causing feedback, also known as remodulation or other interference phenomena known in the art. According to one embodiment, the integral multiple of the transmitter output signal 74, 76 in the first and second band of frequencies may be two, however any suitable integral multiple N may be used such as four, six, eight, ten, twelve and so on.

As shown in FIG. 4, the first signal processing circuit 64 may further include a first divide by N circuit 100 that produces a first divided output signal 102 in response to the first VCO output frequency signal 84 defined within the first band of frequencies. The first divide by N circuit 100 is coupled to a first linear modulation circuit 104 to modulate the first divided output signal 102 and to provide a first linear modulation output 106 as used, for example, in the EDGE wireless communication standard. The first divide by N circuit 100 also is coupled to a first nonlinear modulation circuit 108 to modulate the first divided output signal 102 and to provide a first nonlinear modulation output 110 as used, for example, in the GSM wireless communication standard.

Similarly, the second signal processing circuit 66 further includes a second divide by N circuit 112 to produce a second divided output signal 114 in response to the second VCO output frequency signal 88. According to one embodiment, N is an integer and is selected to reduce the effects of interference such as remodulation. According to another embodiment, N is even, such as two as previously discussed. Second signal processing circuit 66 further includes a second linear modulation circuit 116 to modulate the second divided output signal 114 and to provide a second linear modulation output 118. Second signal processing circuit 66 further includes a second nonlinear modulation circuit 120 to modulate second divided output signal 114 and to provide a second nonlinear modulation output 122.

As previously described, the multiband and multimode transmitter circuit 200 includes the power reduction circuit 72 operatively coupled to the first VCO 82, the second VCO 86, the first divide by N circuit 100, the second divide by N circuit 112, the first linear modulation circuit 104, the first nonlinear modulation circuit 108, the second linear modulation circuit 116, and the second nonlinear modulation circuit 120. The power reduction circuit 72 reduces power to each circuit dynamically and selectively based on detecting the band and modulation modes, as previously described.

For example, if the power reduction circuit 72 selects a modulation mode with linear modulation, the power reduction circuit 72 selectively reduces power to the second VCO 86, the second divide by N circuit 112, the second linear modulation circuit 116, the second nonlinear modulation circuit 120, and the first nonlinear modulation circuit 108 as previously described. Accordingly, power is selectively coupled to the remaining circuits, namely the first VCO 82, the first divide by N circuit 100, and the first linear modulation circuit 104 in order to produce the first linear modulation output 110.

If the power reduction circuit 72 detects a modulation mode with nonlinear modulation, the power reduction circuit 72 selectively reduces power to the first VCO 82, the first divide by N circuit 100, the first linear modulation circuit 104, the first nonlinear modulation circuit 108, and the second linear modulation circuit 116. Accordingly, power is provided to the remaining circuits, namely the second VCO 86, the second divide by N circuit 112, and the second nonlinear modulation circuit 120.

According to this embodiment, a transmitter mode defines both the band selection and the modulation selection. For example, the band selection determines whether the first VCO 82 and the first signal processing circuit 64 are powered or if the second VCO 86 is powered along with the second signal processing circuit 66. Additionally, once the band is determined, then the modulation mode is also determined based on whether linear or nonlinear modulation is desired or should be selected. According to this embodiment, the transmitter mode to produce a transmitter output with linear modulation defines the mode of the multiband and multimode transmitter circuit 200 to operate in the first band with nonlinear modulation. Accordingly, the transmitter mode to produce a transmitter output signal with nonlinear modulation defines the mode of the multiband and multimode transmitter circuit 200 to operate in the second band with nonlinear modulation.

According to another embodiment, the power reduction circuit 72 selectively reduces power based both on whether the multiband and multimode transmitter circuit 200 is operating in the first or second band of frequencies and depending on whether linear or nonlinear modulation is required. A processing circuit determines the band and modulation requirement, for example, based on the operation of the wireless communication system. According to this embodiment, band selection circuit 70 selects a transmitter modulation mode to produce a transmitter output signal with either linear or nonlinear modulation, and a first band selection to produce the transmitter output signal 74, 76 defined in the first or second band of frequencies. If the band selection circuit 70 selects the first band selection, the power reduction circuit 72 selectively reduces power to the second VCO 86, the second divide by N circuit 112, the second linear modulation circuit 116, the second nonlinear modulation circuit 120, and at least one of: the first linear modulation circuit 104 if the transmitter mode operative to produce a transmitter output signal with nonlinear modulation is detected, and the first nonlinear modulation circuit 108 if the transmitter mode operative to produce a transmitter output signal with linear modulation is detected. If, however, the band selection circuit 70 selects a transmitter modulation mode operative to produce a transmitter output signal with either linear or nonlinear modulation, and a second band selection to produce the transmitter output signal 76 defined in the second band of frequencies, the power reduction circuit 72 selectively reduces power to the first VCO 82, the first divide by N circuit 100, the first linear modulation circuit 104, the first nonlinear modulation circuit 108, and at least one of: the second linear modulation circuit 116 if the transmitter mode to produce the transmitter output signal with nonlinear modulation is detected, and the second nonlinear modulation circuit 120 if the transmitter mode to produce a transmitter output signal with linear modulation is detected.

According to another embodiment, the band selection circuit 70 provides a power control signal 90 in response to detecting a transmitter band selection to produce the transmitter output signal 74 at a frequency defined in the first band of frequencies or to produce a transmitter output signal 76 at a frequency defined in the second band of frequencies. The band selection circuit 70 is coupled to the power reduction circuit 72 in order to provide the power control signal 90 based on the band selection. In response to the power control signal 90 associated with a transmitter band selection to produce the first band of frequencies, the band selection circuit 70 provides the power control signal 90 to the power reduction circuit 72 to selectively reduce power to the second VCO 86, the second divide by N circuit 112, the second linear modulation circuit 116, the second nonlinear modulation circuit 120, and at least one of: the first linear modulation circuit 104, and the first nonlinear modulation circuit 108.

Since the band selection circuit 70 selects the transmitter band selection, power is provided to either the first VCO 82 and the first signal processing circuit 64, or to the second VCO 86 and the second signal processing circuit 66. According to this embodiment, either linear or nonlinear modulation may be selected. The band selection circuit 70 receives the power control signal 90 associated with the transmitter band selection to produce the second band of frequencies and provides a second power control signal 90 to the power reduction circuit 72 to selectively reduce power to the first VCO 82, the first divide by N circuit 100, the first linear modulation circuit 104, the first nonlinear modulation circuit 108, and at least one of: the second linear modulation Circuit 116, and the second nonlinear modulation circuit 120. As previously stated, the first VCO output frequency signal 84 may be associated with an N times the first transmitter output signal 74 frequency defined in the first band of frequencies, and the second VCO output frequency signal 88 is associated with an N times the second transmitter output signal 76 frequency defined in the second band of frequencies. As previously stated, operating the first VCO 82 and the first processing circuit 64 or the second VCO 86 and the second signal processing circuit 66 at a multiple frequency of the respective transmitter output signal 74 at a frequency defined in the first band of frequencies or the transmitter output signal 76 at a frequency defined in the second band of frequencies will reduce the occurrence of feedback otherwise known as remodulation within the multiband and multimode transmitter circuit 200 and within synthesizer 12.

Figure 5:
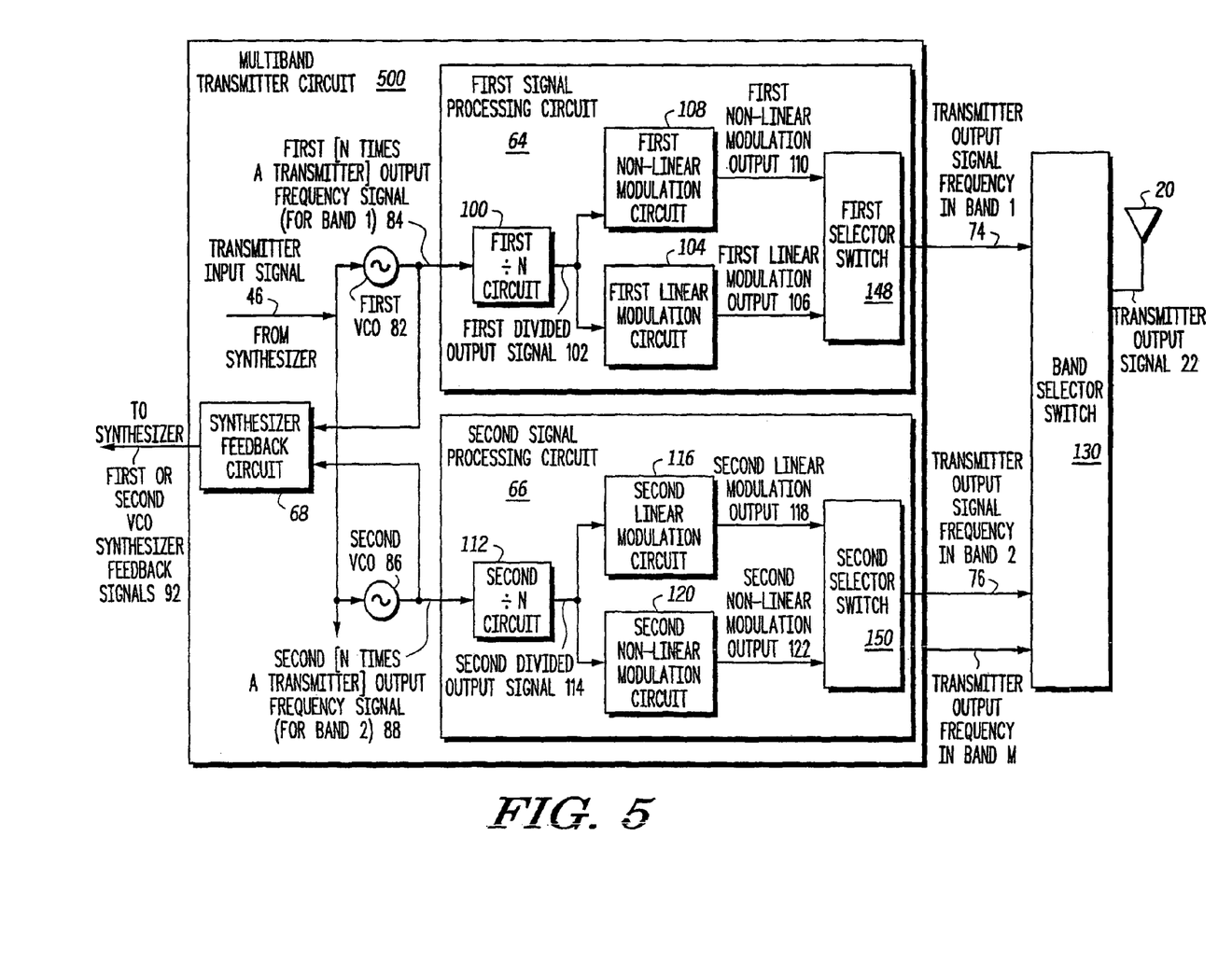
FIG. 5 is a block diagram illustrating yet another example of a transmitter with multiple VCOs according to another exemplary embodiment of the invention.

FIG. 5 illustrates one embodiment of the multiband transmitter circuit 500 having two or more VCOs 82, 86 and a corresponding first signal processing circuit 64 and second signal processing circuit 66. According to this embodiment, multiband transmitter circuit 500 includes at least the first oscillator circuit, such as first VCO 82, and at least a second oscillator circuit such as second VCO 86. As shown, in FIG. 5, two or more oscillator circuits, such as first VCO 82 and second VCO 86 and up to M suitable VCOs may provide a corresponding number of transmitter output frequencies in a band, up to a number of circuits and a corresponding number of bands M in order to provide multiband functionality. As shown in FIG. 5 a band selection switch 130 may combine the transmitter output frequencies in band one, band two, and up to band M in order to produce a transmitter output signal 22. Antenna 20 may be coupled to band selection switch 130 in order to transmit the transmitter output signal 22.

Figure 6:
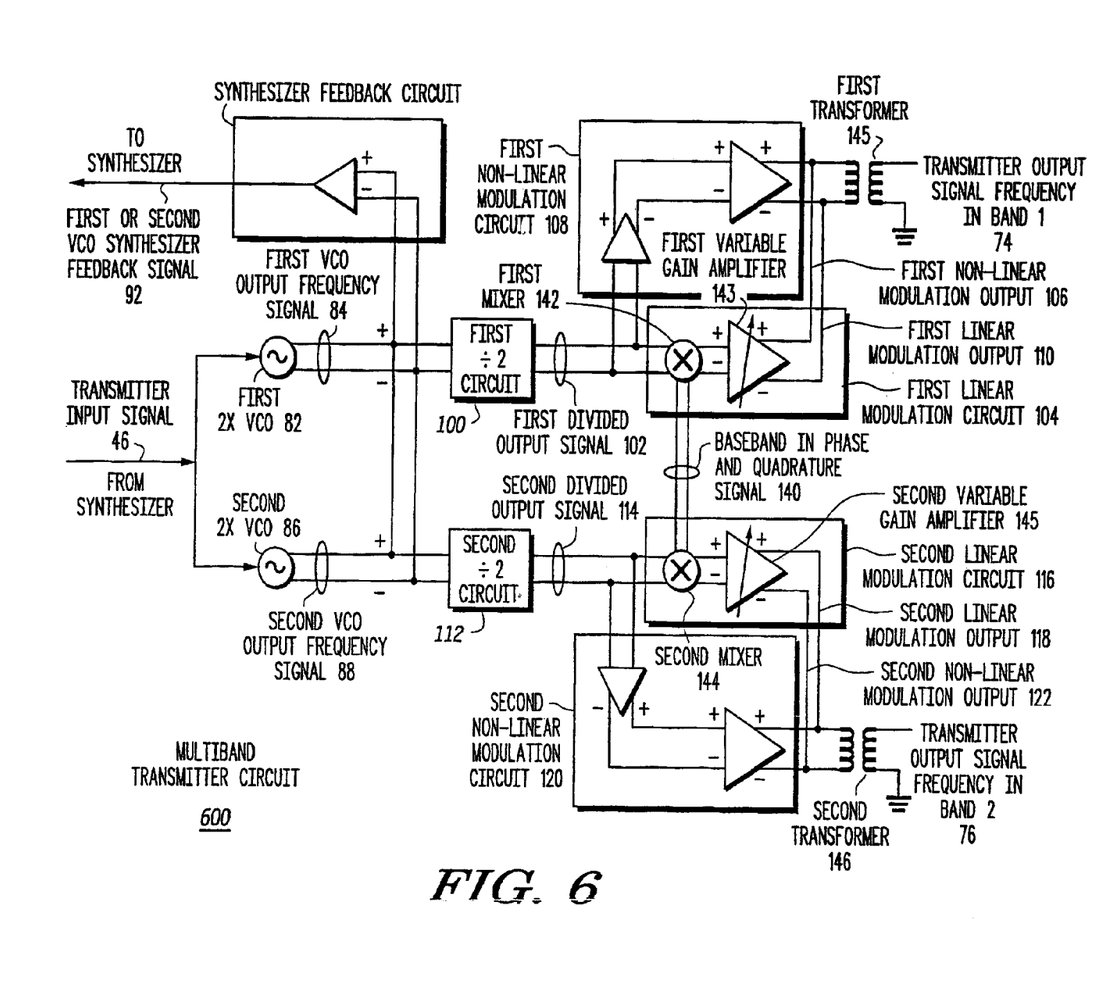
FIG. 6 is a block diagram illustrating one example of the dual VCO transmitter circuit according to another exemplary embodiment of the invention.

FIG. 6 illustrates the multiband transmitter circuit 600 of FIG. 4 according to one exemplary embodiment. According to this embodiment, the first linear modulation circuit 104 modulates the first divided output signal 102 in response to a base band in phase and quadrature signal 140. The base band in phase and quadrature signal 140 may be provided by the processing circuitry, a base band processor, or any other suitable method or mechanism known in the art. Similarly, the second linear modulation circuit 116 modulates the second divided output signal 114 in response to the base band in phase and quadrature signal 140. The first linear modulation circuit 104 includes a first mixer 142 and a first variable gain amplifier 143 to produce the first linear modulation output 110 in response to receiving the base band in phase and quadrature signal 140 and the first divided output signal 102. Similarly, second linear modulation circuit 116 includes a second mixer 144 to receive the second divided output signal 114 and the base band in phase and quadrature signal 140 in order to produce the second linear modulation output 118 via a second variable gain amplifier 145. According to this embodiment, first ÷2 circuit 100 produces the first divided output signal 102 and second ÷2 circuit 112 produces the second divided output signal 114. The mixing of received signals by first mixer 142 and second mixer 144 is known in the art. According to one embodiment, the first linear modulation output 106 and the second linear modulation output 118 are in phase and quadrature phase signals.

A first transformer 145 produces the transmitter output signal 74 in the first band of frequencies in response to receiving the first linear modulation output 106 and the first nonlinear modulation output 110 in a manner known in the art. Similarly, second transformer 146 produces the transmitter output signal 76 frequency in the second band of frequencies in response to receiving second linear modulation output 118 and second nonlinear modulation output 122.

According to one embodiment, all or some of the signals shown in FIG. 6 are differential signals produced, for example by a differential amplifier and received on a differential transmission line. According to one embodiment, first linear modulation circuit 104, as used for example in EDGE, and first non-linear modulation circuit 108, as used for example in GSM, may be a phase locked loop circuit or any suitable active or passive circuit. Additionally, modulation may be in the form of phase shift key (PSK), frequency shift key (FSK), amplitude modulation (AM), or any other suitable type of modulation. According to one embodiment, mixers 142 and 144 are in phase and quadrature (I&Q) modulator mixers capable of mixing the base band in phase and quadrature signals 140, the first divided output signal 102, and the second divided output signal 114.

Figure 7:
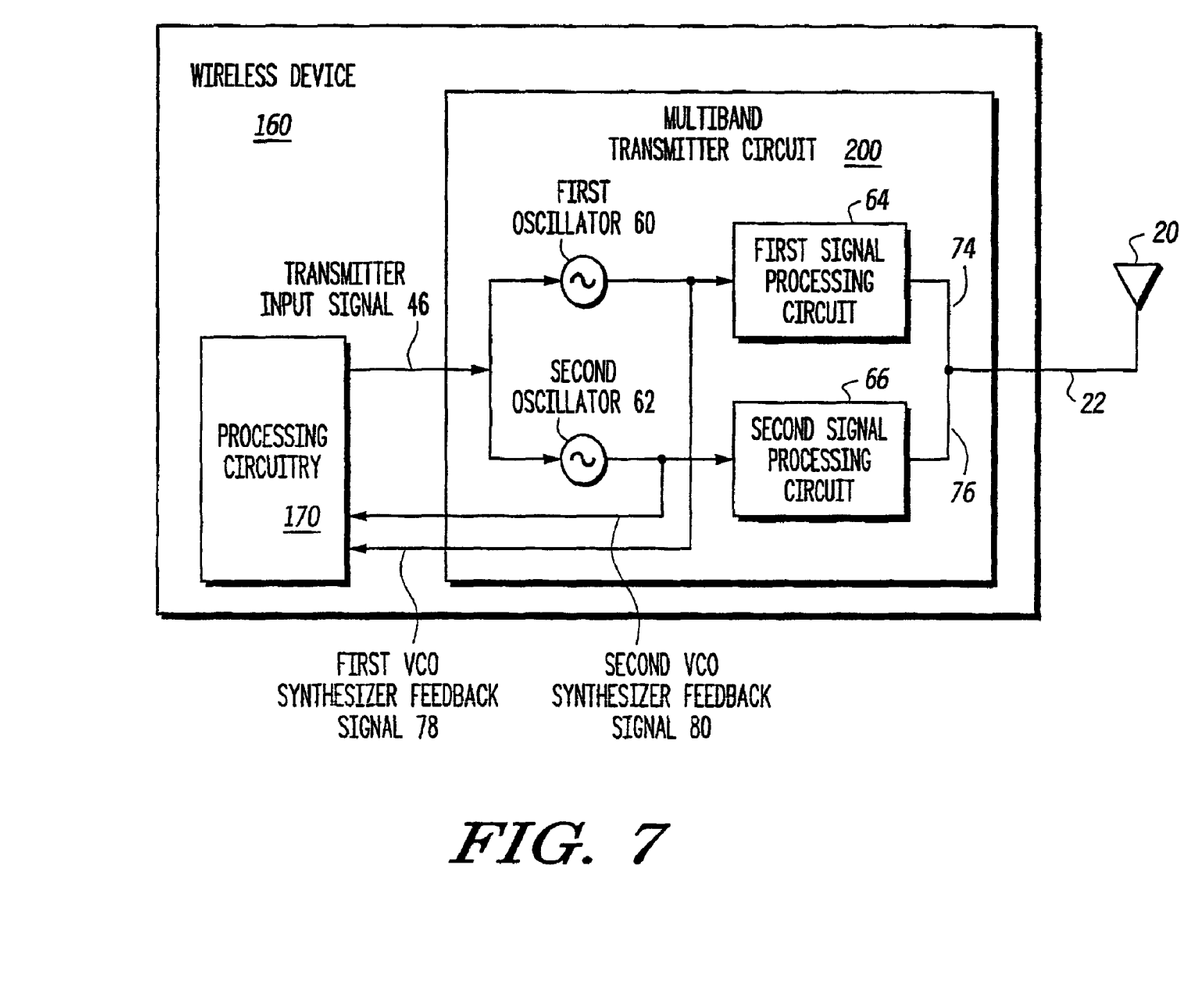
FIG. 7 is a block diagram illustrating one example of a wireless device according to one embodiment of the invention.

FIG. 7 is a block diagram of an exemplary wireless device 160 including processing circuit 170, the multiband transmitter circuit 200, and dual band antenna 20. The multiband and multimode transmitter circuit 200 is operative to receive a transmitter input signal 46 and to produce a transmitter output signal 22 at a frequency defined in at least one of the first band of frequencies, or the second band of frequencies. As stated previously, the multiband and multimode transmitter circuit 200 includes at least the first oscillator 60 and at least a first signal processing circuit 64 to produce the first output frequency signal 74 defined within the first band of frequencies. The multiband and multimode transmitter circuit 200 also includes at least the second oscillator 62 and at least a second signal processing circuit 66 coupled to the second oscillator 62 to produce the transmitter output signal 76 defined within the second band of frequencies in response to the second output frequency signal 80. According to one embodiment, the first oscillator 60 includes a first VCO, and the second oscillator circuit 62 includes a second VCO. Antenna 20 is coupled to the first signal processing circuit 64 and the second signal processing circuit 66 to transmit the transmit output signal 22.

Processing circuit 170 controls the multiband and multimode transmitter circuit 200 to produce the transmitter output signal 22 defined in at least one of each of the first and second band of frequencies. The processing circuit 170 includes one or more processors, such as a microprocessor, DSP, microcomputer or any suitable processing device and associated memory. Processing circuit 170 also includes a synthesizer, such as synthesizer 12 as previously discussed with respect to FIG. 1 to provide the transmitter input signal 46 and to receive the first output frequency signal 78 in the first band of frequencies and the second output frequency signal 80 in the second band of frequencies as previously described.

The multiband and multimode transmitter circuit 200 and method benefits from employing two separate oscillators, such as VCOs, for producing a transmitter output signal 22 at a frequency defined in multiple frequency bands for achieving optimal power consumption and for complying with the required noise criteria when functioning in each of the multiple frequency bands. Since each oscillator 60, 62, functions to provide a transmitter output signal 22 at a particular band of frequencies, each oscillator 60, 62 and corresponding signal processing circuit 64, 66 may be optimized for the lowest power consumption, while meeting the noise performance criteria in each band of frequencies.

As previously stated, the multiband and multimode transmitter circuit 200 employs separate oscillators 60, 62, and separate corresponding signal processing circuits 64, 66 in order to provide a transmitter output signal 22 at the desired frequency band by selectively enabling the appropriate oscillator and corresponding signal processing circuit and disabling, such as reducing power, to the other oscillator and signal processing circuit. As previously stated, the band selection circuit 70 provides the power control signal 90 to reduce power to the oscillators and signal processing circuits that are not in use in order to reduce power consumption. As a result, the above methods and apparatus enable the multiband and multimode transmitter circuit 200 to, among other things, provide a transmitter output signal 22 at a frequency in any band such that power consumption is optimal, while complying with the noise performance requirements for each band.

As such, among other advantages, the above-described apparatus and methods are not limited to, for example, the specific frequency bands described or the specific types of modulation formats described. Rather, it is contemplated that the multiband and multimode transmitter circuit 200 would function in any current or future frequency band, modulation format, and corresponding communications standard currently in use or adopted in the future.

It will be understood that the implementation of other variations and modifications of the invention and its various aspects will be apparent to those with ordinary skills in the art, and that the invention is not limited by this specific embodiment as described. For example, the operating frequency of the synthesizer, VCOs, and signal processing circuits may be at frequency multiples of the transmitter output frequency, where the multiple may be a fractional number, and integer, or any suitable number. It is therefore contemplated to cover by the present invention any and all modifications, variations or equivalent that fall within the spirit and scope of the basic underlying principles disclosed and claimed herein.

What is claimed is:

1. A multiband transmitter circuit operative to receive a transmitter input signal and to produce a transmitter output signal at a frequency defined in at least one of a first band of frequencies, or a second band of frequencies, the multiband transmitter circuit comprising:

at least a first oscillator circuit operative to produce a first output frequency signal defined within the first band of frequencies in response to the transmitter input signal;

at least a first signal processing circuit operatively coupled to the first oscillator circuit, and operative to produce the transmitter output signal defined within the first band of frequencies in response to the first output frequency signal;

at least a second oscillator circuit operative to produce a second output frequency signal defined within the second band of frequencies in response to the transmitter input signal;

at least a second signal processing circuit operatively coupled to the second oscillator circuit, and operative to produce the transmitter output signal defined within the second band of frequencies in response to the second output frequency signal;

the first oscillator circuit further comprising a first voltage controlled oscillator (VCO) operative to produce a first VCO output frequency signal defined within the first band of frequencies in response to the transmitter input signal, and the second oscillator circuit further comprising a second VCO operative to produce a second VCO output frequency signal defined within the second band of frequencies in response to the transmitter input signal; and a synthesizer operative to receive the first and second VCO output frequency signals, wherein the synthesizer is operative to provide the transmitter input signal to the first and second VCOs.

2. The multiband transmitter circuit of claim 1, comprising a power reduction circuit operatively coupled to the first VCO, the first signal processing circuit, the second VCO, and the second signal processing circuit, wherein:

in response to a power control signal that represents transmitting in the first band of frequencies, the power reduction circuit selectively reduces power to the second VCO and to the second signal processing circuit, and in response to a power control signal that represents transmitting in the second band of frequencies, the power reduction circuit selectively reduces power to the first VCO, and to the first signal processing circuit.

3. The multiband transmitter circuit of claim 1, comprising:

band selection circuit operative to provide a power control signal that represents transmitting in the first band of frequencies or in the second band of frequencies, wherein the band selection circuit is operatively coupled to a power reduction circuit wherein:

in response to the power control signal that represents transmitting in the first band of frequencies, the band selection circuit provides a first power control signal to the power reduction circuit to selectively reduce power to the second VCO, and to the second signal processing circuit, and in response to the power control signal that represents transmitting in the second band of frequencies, the band selection circuit provides a second power control signal to the power reduction circuit to selectively reduce power to the first VCO and to the first signal processing circuit.

4. The multiband transmitter circuit of claim 1, comprising at least one band selection switch operative to select the transmitter output signal defined within the first band of frequencies, and the transmitter output signal defined within the second band of frequencies to produce a output signal; and at least one antenna operative to transmit the output signal in response to the output signal.

5. The multiband transmitter circuit of claim 1, wherein the first band of frequencies is substantially from 824 MHz to 915 MHz, and the second band of frequencies is substantially from 1710 MHz to 1910 MHz.

6. The multiband transmitter circuit of claim 1, wherein the first VCO output frequency signal is an integral multiple of the transmitter output signal at a frequency defined in the first band of frequencies, and the second VCO output frequency signal is an integral multiple of the transmitter output signal at a frequency defined in the second band of frequencies.

7. The multiband transmitter circuit of claim 1, wherein the multiband circuit is also a multimode transmitter circuit, and wherein at least the first signal processing circuit further comprises:

a first divide by N circuit, wherein N is an integer, operative to produce a first divided output signal in response to the first VCO output frequency signal defined within the first band of frequencies;

a first linear modulation circuit operative to provide a first linear modulation output in response to the first divided output signal;

a first nonlinear modulation circuit operative to provide a first nonlinear modulation output in response to the first divided output signal;

wherein the second signal processing circuit further comprises:

a second divide by N circuit, wherein N is an integer, operative to produce a second divided output signal in response to the second VCO output frequency signal;

a second linear modulation circuit operative to provide a second linear modulation output in response to the second divided output signal; and a second nonlinear modulation circuit operative to provide a second nonlinear modulation output in response to the second divided output signal.

8. The multiband transmitter circuit of claim 7, comprising a power reduction circuit operatively coupled to the first and second VCOs, the first and second divide by N circuits, the first and second linear modulation circuits, and the first and second nonlinear modulation circuits, wherein:
  in response to detecting a transmitter mode to produce a transmitter output signal with linear modulation, the power reduction circuit is operative to selectively reduce power to the second VCO, the second divide by N circuit, the second linear modulation circuit, the second nonlinear modulation circuit, and the first nonlinear modulation circuit; and
  in response to detecting a transmitter mode to produce a transmitter output signal with nonlinear modulation, the power reduction circuit is operative to selectively reduce power to the first VCO, the first divide by N circuit, the first linear modulation circuit, the first nonlinear modulation circuit, and the second linear modulation circuit.

9. The multiband transmitter circuit of claim 7, comprising a power reduction circuit operatively coupled to the first and second VCOs, the first and second divide by N circuits, the first and second linear modulation circuits, and the first and second nonlinear modulation circuits, wherein:
  in response to detecting a transmitter modulation mode operative to produce a transmitter output signal with either linear or nonlinear modulation, and a first band selection to produce the transmitter output signal defined in the first band of frequencies, the power reduction circuit is operative to selectively reduce power to the second VCO, the second divide by N circuit, the second linear modulation circuit, the second nonlinear modulation circuit, and at least one of: the first non-linear modulation circuit if the transmitter mode operative to produce a transmitter output signal with linear modulation is detected, and the first linear modulation circuit if the transmitter mode operative to produce a transmitter output signal with nonlinear modulation is detected; and
  in response to detecting a transmitter modulation mode operative to produce a transmitter output signal with either linear or nonlinear modulation, and a second band selection to produce a transmitter output signal defined in the second band of frequencies, the power reduction circuit is operative to selectively reduce power to the first VCO, the first divide by N circuit, the first linear modulation circuit, the first nonlinear modulation circuit, and at least one of: the second nonlinear modulation circuit if the transmitter mode operative to produce a transmitter output signal with linear modulation is detected, and the second linear modulation circuit if the transmitter mode to produce a transmitter output signal with nonlinear modulation is detected.

10. The multiband transmitter circuit of claim 7, comprising:
  band selection circuit operative to provide a power control signal in response to detecting a transmitter band selection to produce the transmitter output signal at a frequency defined in the first band of frequencies or in the second band of frequencies, wherein the band selection circuit is operatively coupled to a power reduction circuit wherein:
    in response to the power control signal associated with a transmitter band selection to produce the first band of frequencies, the band selection circuit is operative to provide a first power control signal to the power reduction circuit to selectively reduce power to the second VCO, second divide by N circuit, the second linear modulation circuit, the second nonlinear modulation circuit, and at least one of: the first linear modulation circuit, and the first nonlinear modulation circuit; and
    in response to the power control signal associated with a transmitter band selection to produce the second band of frequencies, the band selection circuit is operative to provide a second power control signal to the power reduction circuit to selectively reduce power to the first VCO, the first divide by N circuit, the first linear modulation circuit, the first nonlinear modulation circuit, and at least one of: the second linear modulation circuit, and the second nonlinear modulation circuit.

11. The multiband transmitter circuit of claim 7 wherein the first VCO output frequency signal is associated with an N times a first transmitter output signal frequency defined in the first band of frequencies, and the second VCO output frequency signal is associated with an N times a second transmitter output signal frequency defined in the second band of frequencies.

12. The multiband transmitter circuit of claim 7, wherein the first linear modulation circuit is operative to modulate the first divided output signal in response to a base band in phase and quadrature phase signal, and the second linear modulation circuit is operative to modulate second divided output signal in response to the base band in phase and quadrature phase signal.

13. A wireless device comprising:
  a multiband transmitter circuit operative to receive a transmitter input signal and to produce a transmitter output signal at a frequency defined in at least one of a first band of frequencies, or a second band of frequencies comprising:
    at least a first oscillator operative to produce a first output frequency signal defined within the first band of frequencies;
    at least a first signal processing circuit operatively coupled to the first oscillator and operative to produce the transmitter output signal defined within the first band of frequencies in response to the first output frequency signal;
    at least a second oscillator operative to produce a second output frequency signal defined within the second band of frequencies;
    at least a second signal processing circuit operatively coupled to the second oscillator and operative to produce the transmitter output signal defined within the second band of frequencies in response to the second output frequency signal;
  an antenna operatively coupled to the multiband transmitter circuit and operative to transmit the transmitter output signal;
  a processing circuit operative to control the multiband transmitter circuit and operative to produce the transmitter output signal defined in at least one of each of the first and second band of frequencies; and
  a synthesizer operative to receive the first oscillator and second oscillator output frequency signals, wherein the synthesizer is operatively coupled to the first oscillator and second oscillator to provide a transmitter input signal.

14. The wireless device of claim 13, wherein the first oscillator circuit further comprises a first voltage controlled oscillator (VCO), and the second oscillator circuit further comprises a second VCO, the wireless device further comprising:

a power reduction circuit operatively coupled to the first VCO, the first signal processing circuit, the second VCO, and the second signal processing circuit, wherein:
  in response to a power control signal that represents transmitting in the first band of frequencies, the power reduction circuit selectively reduces power to the second VCO and to the second signal processing circuit, and
  in response to a power control signal that represents transmitting in the second band of frequencies, the power reduction circuit selectively reduces power to the first VCO, and to the first signal processing circuit.

15. The wireless device of claim 13, wherein the first oscillator circuit further comprises a first voltage controlled oscillator (VCO), and the second oscillator circuit further comprises a second VCO, the wireless device further comprising:
  band selection circuit operative to provide a power control signal that represents transmitting in the first band of frequencies or in a second band of frequencies, wherein the mode detection circuit is operatively coupled to a power reduction circuit wherein:
    in response to the power control signal that represents transmitting in the first band of frequencies, the band selection circuit provides a first power control signal to the power reduction circuit to selectively reduce power to the second VCO and to the second signal processing circuit, and
    in response to the power control signal that represents transmitting in the second band of frequencies, the band selection circuit provides a second power control signal to the power reduction circuit to selectively reduce power to the first VCO and to the first signal processing circuit.

16. A multiband transmitter circuit operative to receive a transmitter input signal and to produce a transmitter output signal at a frequency defined in at least one of a first band of frequencies, or a second band of frequencies, the multiband transmitter circuit comprising:
  at least a first oscillator circuit operative to produce a first output frequency signal defined within the first band of frequencies in response to the transmitter input signal;
  at least a first signal processing circuit operatively coupled to the first oscillator circuit, and operative to produce the transmitter output signal defined within the first band of frequencies in response to the first output frequency signal;
  at least a second oscillator circuit operative to produce a second output frequency signal defined within the second band of frequencies in response to the transmitter input signal;
  at least a second signal processing circuit operatively coupled to the second oscillator circuit, and operative to produce the transmitter output signal defined within the second band of frequencies in response to the second output frequency signal;
  the first oscillator circuit further comprising a first voltage controlled oscillator (VCO) operative to produce a first VCO output frequency signal defined within the first band of frequencies in response to the transmitter input signal, and the second oscillator circuit further comprising a second VCO operative to produce a second VCO output frequency signal defined within the second band of frequencies in response to the transmitter input signal; and
  wherein the multiband circuit is also a multimode transmitter circuit, and wherein at least the first signal processing circuit further comprises:
    a first divide by N circuit, wherein N is an integer, operative to produce a first divided output signal in response to the first VCO output frequency signal defined within the first band of frequencies;
    a first linear modulation circuit operative to provide a first linear modulation output in response to the first divided output signal;
    a first nonlinear modulation circuit operative to provide a first nonlinear modulation output in response to the first divided output signal;
  wherein the second signal processing circuit further comprises:
    a second divide by N circuit, wherein N is an integer, operative to produce a second divided output signal in response to the second VCO output frequency signal;
    a second linear modulation circuit operative to provide a second linear modulation output in response to the second divided output signal; and
    a second nonlinear modulation circuit operative to provide a second nonlinear modulation output in response to the second divided output signal.

17. The multiband transmitter circuit of claim 16, comprising a power reduction circuit operatively coupled to the first and second VCOs, the first and second divide by N circuits, the first and second linear modulation circuits, and the first and second nonlinear modulation circuits, wherein:
  in response to detecting a transmitter mode to produce a transmitter output signal with linear modulation, the power reduction circuit is operative to selectively reduce power to the second VCO, the second divide by N circuit, the second linear modulation circuit, the second nonlinear modulation circuit, and the first nonlinear modulation circuit; and
  in response to detecting a transmitter mode to produce a transmitter output signal with nonlinear modulation, the power reduction circuit is operative to selectively reduce power to the first VCO, the first divide by N circuit, the first linear modulation circuit, the first nonlinear modulation circuit, and the second linear modulation circuit.

18. The multiband transmitter circuit of claim 16, comprising a power reduction circuit operatively coupled to the first and second VCOs, the first and second divide by N circuits, the first and second linear modulation circuits, and the first and second nonlinear modulation circuits, wherein:
  in response to detecting a transmitter modulation mode operative to produce a transmitter output signal with either linear or nonlinear modulation, and a first band selection to produce the transmitter output signal defined in the first band of frequencies, the power reduction circuit is operative to selectively reduce power to the second VCO, the second divide by N circuit, the second linear modulation circuit, the second nonlinear modulation circuit, and at least one of: the first non-linear modulation circuit if the transmitter mode operative to produce a transmitter output signal with linear modulation is detected, and the first linear modulation circuit if the transmitter mode operative to produce a transmitter output signal with nonlinear modulation is detected; and
  in response to detecting a transmitter modulation mode operative to produce a transmitter output signal with either linear or nonlinear modulation, and a second band selection to produce a transmitter output signal defined in the second band of frequencies, the power reduction circuit is operative to selectively reduce power to the first VCO, the first divide by N circuit, the first linear modulation circuit, the first nonlinear modulation circuit, and at least one of: the second nonlinear modulation circuit if the transmitter mode operative to produce a transmitter output signal with linear modulation is detected, and the second linear modulation circuit if the transmitter mode to produce a transmitter output signal with nonlinear modulation is detected.

19. The multiband transmitter circuit of claim 16, comprising:

band selection circuit operative to provide a power control signal in response to detecting a transmitter band selection to produce the transmitter output signal at a frequency defined in the first band of frequencies or in the second band of frequencies, wherein the band selection circuit is operatively coupled to a power reduction circuit wherein:

in response to the power control signal associated with a transmitter band selection to produce the first band of frequencies, the band selection circuit is operative to provide a first power control signal to the power reduction circuit to selectively reduce power to the second VCO, second divide by N circuit, the second linear modulation circuit, the second nonlinear modulation circuit, and at least one of: the first linear modulation circuit, and the first nonlinear modulation circuit; and in response to the power control signal associated with a transmitter band selection to produce the second band of frequencies, the band selection circuit is operative to provide a second power control signal to the power reduction circuit to selectively reduce power to the first VCO, the first divide by N circuit, the first linear modulation circuit, the first nonlinear modulation circuit, and at least one of: the second linear modulation circuit, and the second nonlinear modulation circuit.

20. The multiband transmitter circuit of claim 16 wherein the first VCO output frequency signal is associated with an N times a first transmitter output signal frequency defined in the first band of frequencies, and the second VCO output frequency signal is associated with an N times a second transmitter output signal frequency defined in the second band of frequencies.

21. The multiband transmitter circuit of claim 16, wherein the first linear modulation circuit is operative to modulate the first divided output signal in response to a base band in phase and quadrature phase signal, and the second linear modulation circuit is operative to modulate second divided output signal in response to the base band in phase and quadrature phase signal.

* * * * *